(12) United States Patent
Neumann et al.

(10) Patent No.: US 9,115,018 B2
(45) Date of Patent: Aug. 25, 2015

(54) DRAWING METHOD FOR PRODUCING CYLINDRICAL COMPONENTS FROM QUARTZ GLASS

(75) Inventors: Christian Neumann, Hungen (DE); Boris Gromann, Aschaffenburg (DE); Lothar Huefner, Bruchkoebel (DE); Heinz Bauscher, Langenselbold (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 278 days.

(21) Appl. No.: 13/814,453

(22) PCT Filed: Jun. 29, 2011

(86) PCT No.: PCT/EP2011/060884
§ 371 (c)(1),
(2), (4) Date: Mar. 19, 2013

(87) PCT Pub. No.: WO2012/016767
PCT Pub. Date: Feb. 9, 2012

(65) Prior Publication Data
US 2013/0186137 A1 Jul. 25, 2013

(30) Foreign Application Priority Data
Aug. 5, 2010 (DE) .......................... 10 2010 033 408

(51) Int. Cl.
*C03B 17/04* (2006.01)
(52) U.S. Cl.
CPC ...................................... *C03B 17/04* (2013.01)
(58) Field of Classification Search
CPC ............. C03B 17/04; C03B 37/01265; C03B 37/1274; C03B 21/02; C03B 21/02
See application file for complete search history.

(56) References Cited

U.S. PATENT DOCUMENTS

| | | | | |
|---|---|---|---|---|
| 1,562,115 A | * | 11/1925 | Miller | 65/183 |
| 1,620,511 A | | 3/1927 | Berry | |
| 1,711,818 A | * | 5/1929 | Stuckey | 65/122 |
| 5,026,413 A | * | 6/1991 | Lebert et al. | 65/29.13 |
| 6,763,682 B1 | * | 7/2004 | Sayce et al. | 65/17.4 |

(Continued)

FOREIGN PATENT DOCUMENTS

DE 10 2009 014 418 B3 4/2010
EP 0 394 640 B1 6/1994

(Continued)

OTHER PUBLICATIONS

English Language espacnet Abstract of JP 6-127953 A, May 10, 1994.

*Primary Examiner* — Queenie Dehghan
(74) *Attorney, Agent, or Firm* — Tiajoloff and Kelly LLP

(57) ABSTRACT

In a known drawing method for producing a cylindrical component from quartz glass, a quartz glass strand (2) is continuously drawn off from a softened quartz glass composition (13) vertically downwards in the drawing direction (3), a piece (15) with a weight G is detached from the free end of the strand at a time t1 and the cylindrical component is produced from the piece (15). When the piece (15) is detached, there may be a sudden reduction in weight, which leads to fluctuations in the thawing-off control. To counteract this, it is proposed according to the invention that a weight compensating force which acts counter to the drawing direction (3), increases over time and completely or partially compensates for the weight G of the piece (15), is applied to the piece to be detached at a time t0 before t1.

15 Claims, 2 Drawing Sheets

(56) References Cited

U.S. PATENT DOCUMENTS

Figures 1, 2:
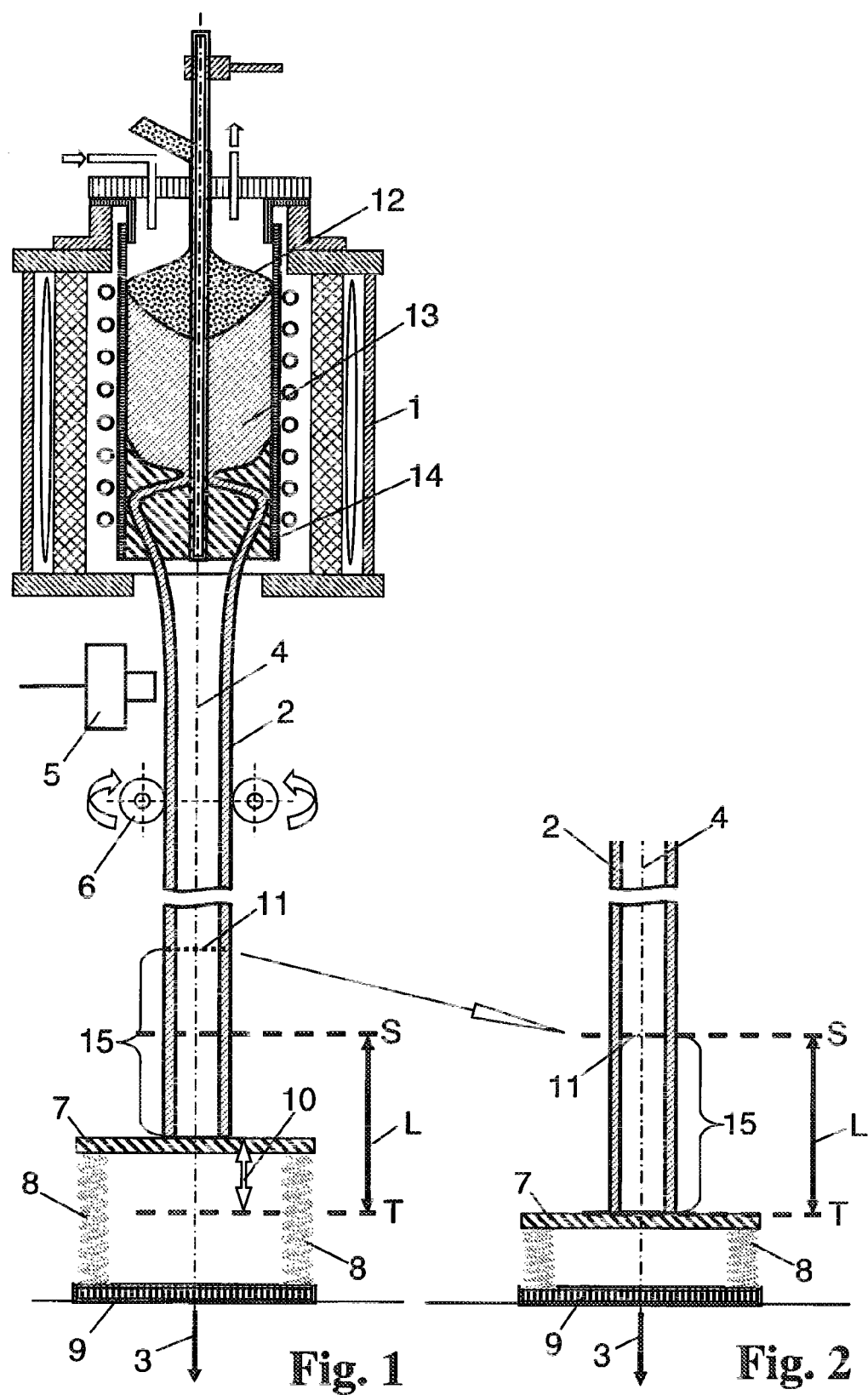

| | | |
|---|---|---|
| 7,600,399 B2 | 10/2009 | Bogdahn et al. |
| 2005/0076675 A1 | 4/2005 | Bogdahn et al. |
| 2012/0011889 A1 | 1/2012 | Bogdahn et al. |

FOREIGN PATENT DOCUMENTS

| | | |
|---|---|---|
| JP | 6-127953 | 5/1994 |
| WO | 03/022757 A1 | 3/2003 |

* cited by examiner

DRAWING METHOD FOR PRODUCING CYLINDRICAL COMPONENTS FROM QUARTZ GLASS

The present invention refers to a drawing method for producing a cylindrical component from quartz glass in that a quartz-glass strand is continuously drawn off vertically downwards in drawing direction from a softened quartz-glass mass, a section with a weight G is separated from the free strand end at a time t1, and the cylindrical component is produced from the section.

In vertical drawing processes, quartz-glass tubes or quartz glass rods are continuously drawn off at a controlled drawing speed by means of a draw-off device from a quartz glass mass softened in a crucible or from a quartz glass preform softened zone by zone. To avoid changes in the geometry of the drawn-off quartz glass strand, the drawing speed is kept constant.

There is often the problem that the drawn-off quartz glass strand has to be separated into sections of a given length. To this end a predetermined breaking point is first formed by wounding the external surface area, e.g. by way of scratching or cutting, usually below the draw-off device on the external surface of the glass strand that is moving in the direction of its longitudinal length, and the glass strand is subsequently broken at the predetermined breaking point in that a force acting in pulse-like fashion on the area of the predetermined breaking point is exerted, e.g. by way of an impact.

The mechanical pulse during the separating action may cause defects or disorders in the softening area; these may lead to diameter and wall-thickness variations while the quartz glass strand is being drawn off. Apart from this, the weight of the quartz glass strand will be continuously increasing until the section of the desired length has been separated; during separation, however, a sudden weight reduction occurs. This effect leads to variations in the draw-off control that may lead to a rebounding of the remaining glass strand. As a result, disorders are transmitted to the area of the softened quartz-glass mass; these are visible as optically clearly discernible bumps in the drawn-off quartz glass strand.

Especially with applications where high demands are made on the dimensional stability of the component, diameter variations may lead to rejects.

PRIOR ART

A generic method for drawing a quartz glass strand from a softened quartz glass mass is known from DE 10 2009 014 418 B3. To minimize the waste of material due to diameter variations that are caused because of the mechanical pulse during separation of the section, the separation position is disposed such that the diameter variations come to lie in the end portion of the component or between two components.

In this procedure geometrical variations in the drawn-off glass strand are placed such that they cause as little waste of material as possible; they are however not avoided.

WO 2003/022757 A1 (U.S. Pat. No. 7,600,399 B2) aims at mastering the sudden weight change during separation of the strand section by way of a control technique, while surface damage caused by the draw-off device is minimized at the same time. To this end the draw-off device comprises a plurality of rolling bodies which are rolling on the glass strand and are distributed over the circumference thereof and of which one forms a reference rolling body and the others form auxiliary rolling bodies. The drawing rate is controlled via the speed of the reference rolling body, with the value for the torque of the reference rolling body being continuously determined in response to the weight of the drawn-off quartz glass strand and said value being used as a set point value for the torque of all auxiliary rolling bodies.

The compensation during separation of the section underneath the drawn-off device will at best be successful in the case of minor weights and requires certain control and regulation efforts at any rate.

It is suggested in EP 0 395 640 B1 that a tubular strand of quart/glass should be separated under water or in a pressure chamber in which a pressure similar to that in the inner hole of the tube is prevailing.

This procedure serves to prevent variations of the internal pressure of the tube during separation of the section. It is constructionally relatively complicated and has no influence on disorders in the quartz glass strand geometry caused by the sudden weight change.

U.S. Pat. No. 1,620,511 describes a method for producing a quartz glass strand in which a softened quartz-glass mass solely flows out by virtue of its weight, i.e. without any additional mechanical draw-off device and without any draw-off control, into a tubular container that is suited for accommodating the maximum length of the quartz glass strand to be drawn. To keep the effective weight approximately constant with an increasing length of the strand, a weight compensation is suggested in the case of which the quartz glass strand while descending into the tubular container pushes a platform downwards, which platform simultaneously pulls a mechanical counterweight in the form of a chain of approximately the same weight upwards by way of a pulley.

Sections have not to be separated in this procedure, and the suggested weight compensation would also not be suited for preventing sudden weight changes during cutting to length.

TECHNICAL OBJECTIVE

It is the object of the present invention to indicate a simple drawing method for producing quartz glass components in which geometrical disorders are reduced, particularly diameter or wall-thickness variations due to sudden weight changes when the quartz glass strand is cut to length.

ILLUSTRATION OF THE INVENTION

Starting from a drawing method of the aforementioned type, this object is achieved according to the invention in that at a time t0, which is prior to time t1, a weight compensation force which is applied to the section to be separated, said weight compensation force is operative in opposition to the drawing direction and it increases with time and it compensates the weight G of the section either fully or in part.

In the method according to the invention a weight compensation force is applied to the section to be separated prior to the separation of the section, said weight compensation force being operative in a direction opposite to the weight force of the quartz glass strand and compensating the weight of the section to be separated completely or in part, with a complete compensation being also attainable through a weight compensation force that is greater than the weight of the section.

First of all, the ideal case for the build-up and decrease over time and the action of the weight compensation force shall be explained hereinafter.

The weight compensation force is continuously built up and reaches its maximum at time t1, during separation of the section. The amount of the weight compensation force does then exactly correspond to the weight of the corresponding section. After separation and withdrawal of the section from the remaining strand, the weight compensation force will suddenly assume zero again. At the same time the renewed build-up will start until the maximum has been reached in the separating process. The weight compensation force is here built up in synchronism with the increase in weight of the drawn-off quartz glass strand.

The draw-off control thereby determines a constant weight of the drawn-off strand at any time. Control interventions by way of a slow or sudden weight decrease during separation are not needed. Diameter and wall-thickness variations, such as "bumps", are thereby avoided.

In practice, measures that do not conform to the above-described ideal case also help to reduce geometry variations of the strand. For instance, the build-up of the weight compensation force may start at a later time than directly after the separation of the section; the build-up cannot take place linearly and at a faster pace than would conform to the synchronicity with the weight increase of the drawn-off strand, and the maximum amount of the weight compensation force can be smaller than the weight of the separated section. A weight compensation force that is greater than the weight of the section to be separated would also yield an improvement, but requires special compensation measures during separation and removal of the section and is therefore not preferred (insofar as the following comments refer to a "set point value" of the weight compensation force, this designates a value that is maximally as great as the weight force of the separated section).

It is important that the gradually increasing weight compensation force is operative on the section to be separated. As soon as the separated section has been removed, the weight compensation force is also eliminated. This ensures the synchronicity between the omission of the weight force of the section and the weight compensation force without any major control and regulation efforts.

Preferably, the weight compensation force is continuously increasing from time t0 up to time t1.

Since the increase in the weight compensation force shows no sudden changes or reversals within the interval, but is continuous, the change can be easily detected, processed and, if necessary, easily compensated by the draw-off control.

In the above-explained ideal case t0 corresponds to the time at which the previous section has been separated, so that the time interval between t0 and t1 defines the period that is needed for drawing off the section. This time interval may however also be shorter.

In this connection it has turned out to be advantageous when at the time interval between t0 and t1 the increase in the weight compensation force is greater than the weight increase of the quartz glass strand within the same time interval.

Since the increase in the weight compensation force takes place at a faster pace than the weight increase in the quartz glass strand, the weight compensation force reaches its set point value within a period shorter than the period for drawing the section to be separated. It is thereby possible to shift t0 to a "later" time which is e.g. shortly before t1. The period for applying the weight compensation force to the section can therefore be chosen to be short, which simplifies handling and allows compact devices for producing the weight compensation force.

Preferably, at the time interval between t0 and t1 the increase in the weight compensation force by the factor 2 to 20, preferably by the factor 4 to 10, is greater than the weight increase of the quartz glass strand.

At a relatively small factor of 2 (preferably a factor 4) there remains a relatively long period from the start of the weight compensation force up to the achievement of its set point value, said relatively long period reliably preventing an overshooting of the draw-off control and making it easier for the operator to take precautions for separating the section, for example the formation of a predetermined breaking point.

At a relatively great factor of more than 20 a short period, within which a weight change takes place, remains from the start of the weight compensation force up to the achievement of its set point value; this is more difficult to handle by the draw-off control.

It has turned out to be useful when at the time t1 the amount of the weight compensation force is smaller than the amount of G.

At time t1, i.e. during separation of the section, the weight force G which is operative in drawing direction is greater than the weight compensation force which is operative in the opposite direction and acts on the section. As a result, the section will move downwards after separation from the remaining strand, and it can be removed immediately without any additional measures being required for removing the section, such as a reduction of the weight compensation force.

The weight compensation force can be applied to the outer cylindrical surface of the section. Easy to perform and thus particularly preferred is however a procedure in which the weight compensation force acts on the front side of the quartz glass strand in opposition to the drawing direction.

In this case a force which is gradually increasing during further lowering and which is operative in opposition to the drawing direction and is here called "weight compensation force" is exerted against the front side of the drawn-off quartz glass strand.

Said force is preferably produced in that the quartz glass strand runs against an elastic abutment while being drawn off.

The elastic abutment is e.g. one or a plurality of mechanical or hydraulic springs, such as e.g. spiral, leaf, disc or gas-pressure springs. Since the lower end at the front side runs against a resilient elastic abutment, one obtains a defined end position for the lower front side. In combination with a predetermined height for the separation plane, this makes it easier to observe a constant cutting length for the sections. For instance, when the strand comes to lie on the abutment for the first time, the predetermined breaking point can be produced at a predetermined level.

The drawing method according to the invention makes it also possible to measure the weight of the drawn-off strand and to start the separation of the section when a set point value has been reached.

The separating process can be initiated manually or automatically. Likewise, a method variant is also operative in which the weight compensation force is continuously measured and the section is separated when a set point value has been reached.

Furthermore, it has turned out to be useful to provide a predetermined breaking point on the quartz glass strand, and prior to the separation of the section a mechanical clamp is attached that is operative in the area above and in the area below the predetermined breaking point.

The mechanical clamp engages the quartz glass strand above and below the predetermined breaking point and reduces a deflection of the strand during separation of the section. Said vibration-attenuating measure has an additional advantageous effect on the dimensional stability and constancy of the strand geometry.

The method according to the invention is particularly suited for drawing a quartz glass strand in a vertical drawing method in which the quartz glass mass is softened in a melting crucible and drawn off via a bottom outlet as the quartz glass strand.

With the help of such crucible-type drawing methods, particularly large-volume quartz glass tubes of a great cutting length and a correspondingly great weight can be drawn off, so that without any counter-measures particularly pronounced weight changes will occur when the quartz glass strand is cut off.

PREFERRED EMBODIMENTS

Figure 3:
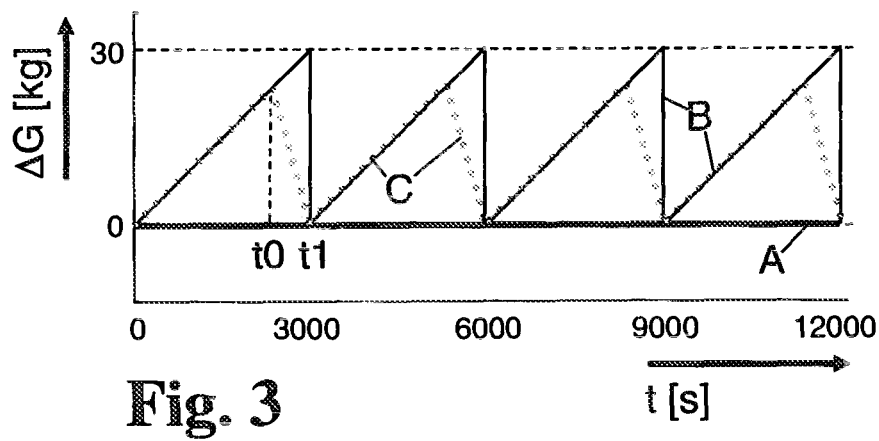
Figure 4:
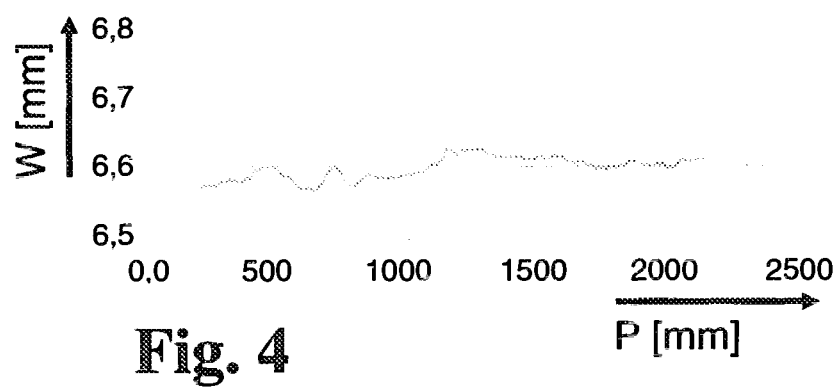
Figure 5:
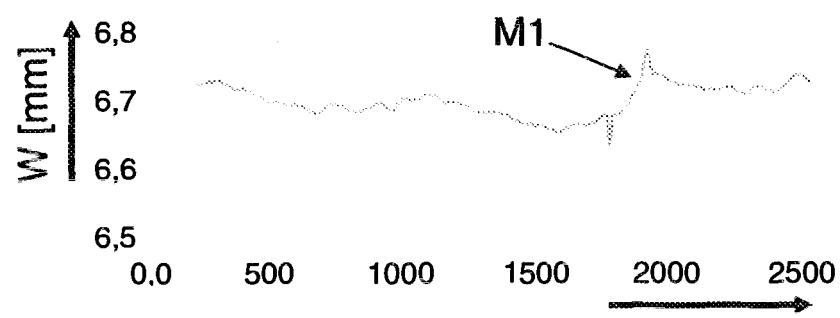

The invention will now be explained in more detail with reference to embodiments and a drawing. Schematically shown is in FIG. 1 an apparatus for drawing a quartz glass tube on the basis of the method according to the invention;

FIG. 2 a section of the same apparatus at a later stage of the drawing process;

FIG. 3 a profile showing the time progress of the strand-mass weight to be carried off at the draw-off device;

FIG. 4 a diagram with a typical curve of the wall thickness over a tubular strand piece drawn according to the invention; and FIG. 5 a diagram with a typical curve of the wall thickness over a tubular strand piece drawn according to the prior art.

The apparatus according to FIG. 1 schematically shows a melting crucible 1 in which quartz glass granules 12 are heated to a temperature above 2100° C. and are softened into a quartz glass mass 13 which is drawn off vertically downwards via a bottom outlet 14 of the melting crucible 1 as a quartz glass strand 2, the longitudinal axis thereof being oriented as much as possible in parallel with the drawing axis 3. This crucible pulling method is generally known, so that the description of constructional details and method measures is omitted.

A roll dragging means 6 which comprises two draw-off rolls that are opposite to each other at the same height plane on the outer cylindrical surface of the tubular strand 2 serves as a draw-off device.

A diameter and wall-thickness measuring device 5 by means of which a wall thickness profile of the drawn-off tubular strand 2 is recorded during the drawing process is arranged underneath the melting crucible 1.

During the drawing-off operation the free end of the tubular strand 2 gets into abutment with a bending-resistant plastic plate 7 which is supported on four spiral springs 8 of the same constructional design. Plastic plate 7 and spiral springs 8 rest on a weighing plate 9. The spiral springs 8 have a length of about 80 cm and a spring constant of about 145 N/m.

FIG. 2 shows a section of the same apparatus at a later time of the drawing process, namely under maximal load of the spiral springs 8.

An embodiment for performing the drawing method according to the invention for producing a quartz glass tube will now be explained in more detail with reference to FIG. 1 and FIG. 2.

A quartz glass tube 2 is drawn off from the melting crucible 1 at a controlled draw-off rate of 1 mm/s to a set point outer diameter of 197 mm and a set point wall thickness of 6.5 mm. A gas is introduced into the inner hole of the tubular strand 2.

A wall thickness profile of the drawn-off tubular strand 2 is continuously recorded by means of the diameter and wall-thickness measuring device 5, as will be explained in more detail further below with reference to FIG. 2.

The drawn-off tubular strand 2 is separated, including an allowance of 5 cm at both sides, into sections 15 of 3 m each. The cutting length L is thus 3 m. Separated sections 15 of that length have a weight of about 30 kg. Tubular quartz-glass components with the final dimension of 2.90 m are made from these sections.

Each section 15 is separated at the level of the cutting plane S as soon as the lower end of the strand 2 has reached the separation plane T. This corresponds to time t1 and the corresponding position (height of the separation plane T) is detected on the basis of the weight displayed by the weighing plate 9. This stage of the drawing process is shown in FIG. 2.

Before the lower end of the quartz glass strand 2 has reached the separation plane T, it abuts against the plastic plate 7 and thereby deforms the spiral springs 8. This corresponds to time t0, starting from which the weight compensation force is gradually built up, but the spiral springs 8 are still unloaded, as shown in FIG. 1. During the further lowering of the tubular strand 2 the weight compensation force is continuously increased due to the spring action of the spiral springs 8, said weight compensation force acting on the tubular strand 2 in opposition to the drawing direction 3 and partly compensating the weight thereof.

The separation plane T is 0.5 m below the lower edge of the plastic plate 7 (as indicated by the block arrow 10). As soon as the lower edge of the plastic plate 7 has reached the separation plane T (i.e. at time t1, which is about 500 s after t0, i.e. the first contact between tubular strand 2 and plastic plate 7) and after the predetermined set point weight has been displayed on the weighing plate 9, the section 15 having a length of 3 m is separated in the cutting plane S. The amount of the weight compensation force is at that time slightly (about 1 kg) smaller than the weight force of the section 15 to be separated.

Prior to separation a predetermined breaking point 11 is produced on the quartz glass strand 2 and a bending-resistant clamp (not shown in FIG. 1) is attached, which clamp connects the areas above and below the predetermined breaking point 11 and thereby prevents excessive deflections by the impact impulse during severance.

Due to the given spring constants the spiral springs 8 have produced up to time VI a weight compensation force that corresponds approximately to the weight force of the separated section 15. The compression path of the spiral springs 8 is 0.5 m and thus only ⅙ of the length of the section 15 to be separated. Within the time interval between t0 and t1 the increase in the weight compensation force is thus by the factor 6 greater than the weight increase of the quartz glass strand 2 during the same time interval.

When the separated section 15 is removed, both the weight force and the weight compensation force as parameters for the drawing process are cancelled, so that this process is not recorded in the form of a weight change by the draw-off control.

The diagram of FIG. 3 shows the weight change over time in the drawing process for the above-explained embodiment (curve C) as compared with the ideal case (curve A) and the prior art (curve B).

The weight change "ΔG" (in kg) of the drawn-off quartz glass strand is plotted on the y-axis against the drawing duration "t" (in s).

Curve A represents the ideal case in which the weight compensation force is increasing and decreasing in synchronism with the weight force, so that there will be no weight change.

Curve B shows the weight change over time in a drawing method according to the prior art. After a section has been separated, the weight is continuously increasing up to a maximum of 30 kg (in the embodiment) and suddenly decreases to the initial value 0 again when the section 15 is separated. This sudden weight change can hardly be compensated by an electric control without overshooting and associated geometry changes, particularly not in the case of heavy sections 15.

Curve C shows the progress of the weight change over time in the method according to the invention on the basis of the data of the embodiment. After a section 15 has been separated, the weight is continuously increasing up to a maximum of about 25 kg at time t0. The lower end then abuts on the plastic plate 7 and the weight compensation force starts to build up and due to the set spring constant it increases at a faster pace than the weight force of the strand 2 during the further withdrawal. That is why the previously built-up weight difference is decreasing again and almost reaches the initial value at separation time t1, so that the distance control has hardly to compensate a weight difference (in the embodiment: 1 kg) during separation. The progress of the weight change as is schematically shown in curve C does not exhibit any sudden changes, but only gradual weight changes that can easily be handled by an electric draw-off control.

The diagram of FIG. 4 shows a typical profile of the wall thickness "W" (in mm) over the position "P" for a section of the tubular strand 2 having a length of about 2 m and a nominal wall thickness of 6.5 mm. The tubular piece comprises the longitudinal section in which a dent or bump would have to be expected due to a cutting-off process. The axial tube axis position is plotted on the x-axis in mm, and the wall thickness on the y-axis.

It is true that the wall thickness profile shows a number of minima and maxima that are approximately evenly distributed over the tubular strand section. Particularly pronounced extreme values do however not occur. The detectable deviations from the mean value are substantially due to pressure variations and the control behavior of the draw-off control due to slower weight changes.

By comparison, the wall thickness profile of FIG. 5 has to be assigned to a tubular strand piece which has been produced with the help of a drawing method according to the prior art. Similar variations in the wall thickness as in FIG. 4 can be detected; these are mainly due to the control behavior of the draw-off control. In addition, however, a pronounced maximum M1 which is due to a sudden weight change during separation of a section can be detected.

The invention claimed is:

1. A drawing method for producing a cylindrical component from quartz glass, said method comprising:
   drawing a quartz-glass strand continuously off vertically downwards in drawing direction from a softened quartz-glass mass;
   separating a section with a weight G from a free strand end at a time t1; and
   producing the cylindrical component from the section;
   wherein at a time t0, which is prior to time t1, a weight compensation force is applied to the section to be separated, said weight compensation force is operative in opposition to the drawing direction and said weight compensation force increases with time and compensates either fully or in part for the weight G of the section; and
   wherein, in a time interval between t0 and t1, the weight compensation force has an increase greater than a weight increase of the quartz glass strand at the time interval.

2. The drawing method according to claim 1, wherein the weight compensation force increases continuously from time t0 up to time t1.

3. The drawing method according to claim 1, wherein, in the time interval between t0 and t1, the increase in the weight compensation force is greater than the weight increase of the quartz glass strand by a factor of from 2 to 20.

4. The drawing method according to claim 1, wherein at the time t1 the weight compensation force is smaller than the weight G.

5. The drawing method according to claim 1, wherein the weight compensation force acts on a front side of the quartz glass strand in a direction opposite to the drawing direction.

6. The drawing method according to claim 1, wherein the weight of the drawn-off strand is measured and the section is separated when a desired value of the measured weight has been reached.

7. The drawing method according to claim 1, wherein a predetermined breaking point is provided on the quartz glass strand, and, prior to the separation of the section, a clamp is attached that is operative in an area above and in an area below the predetermined breaking point.

8. The drawing method according to claim 1, wherein the quartz glass mass is softened in a melting crucible and drawn off as the quartz glass strand via a bottom outlet.

9. The drawing method according to claim 1, wherein, in the time interval between t0 and t1, the increase in the weight compensation force is greater than the weight increase of the quartz glass strand by a factor of from 4 to 10.

10. A drawing method for producing a cylindrical component from quartz glass, said method comprising:
   drawing a quartz-glass strand continuously off vertically downwards in drawing direction from a softened quartz-glass mass;
   separating a section with a weight G from a free strand end at a time t1; and producing the cylindrical component from the section;
   wherein at a time t0, which is prior to time t1, a weight compensation force is applied to the section to be separated, said weight compensation force is operative in opposition to the drawing direction and said weight compensation force increases with time and compensates either fully or in part for the weight G of the section;
   wherein the weight compensation force acts on a front side of the quartz glass strand in a direction opposite to the drawing direction; and
   wherein the weight compensation force is produced by the quartz glass strand running against an elastic abutment while being drawn off.

11. The drawing method according to claim 10, wherein the weight compensation force increases continuously from time t0 up to time t1.

12. The drawing method according to claim 10, wherein at the time t1 the weight compensation force is smaller than the weight G.

13. The drawing method according to claim 10, wherein the weight of the drawn-off strand is measured and the section is separated when a desired value of the measured weight has been reached.

14. The drawing method according to claim 10, wherein a predetermined breaking point is provided on the quartz glass strand, and, prior to the separation of the section, a clamp is attached that is operative in an area above and in an area below the predetermined breaking point.

15. The drawing method according to claim 10, wherein the quartz glass mass is softened in a melting crucible and drawn off as the quartz glass strand via a bottom outlet.

* * * * *